(12) United States Patent
Battle

(10) Patent No.: US 11,983,718 B2
(45) Date of Patent: May 14, 2024

(54) SYSTEMS AND METHODS FOR PERFORMING SECURE COMMERCIAL TRANSACTIONS

(71) Applicant: Selfiepay Holdings, Inc., Brooklyn, NY (US)

(72) Inventor: Sharron Battle, Las Vegas, NV (US)

(73) Assignee: Selfiepay Holdings, Inc., Las Vegas, NV (US)

( * ) Notice: Subject to any disclaimer, the term of this patent is extended or adjusted under 35 U.S.C. 154(b) by 0 days.

(21) Appl. No.: 17/663,130

(22) Filed: May 12, 2022

(65) Prior Publication Data

US 2023/0095181 A1    Mar. 30, 2023

Related U.S. Application Data

(63) Continuation of application No. 16/232,589, filed on Dec. 26, 2018, now abandoned, which is a (Continued)

(51) Int. Cl.
  *G06Q 40/00* (2023.01)
  *G06F 21/32* (2013.01)
  (Continued)

(52) U.S. Cl.
  CPC ....... *G06Q 20/40145* (2013.01); *G06F 21/32* (2013.01); *G06Q 20/12* (2013.01); (Continued)

(58) Field of Classification Search
  CPC ............. G06Q 20/40145; G06Q 20/12; G06Q 20/3224; G06Q 30/06; G06Q 50/01; G06F 21/32
  See application file for complete search history.

(56) References Cited

U.S. PATENT DOCUMENTS 7,418,427 B1 * 8/2008 Drummond .......... G06Q 20/105
   705/41
7,483,862 B1 * 1/2009 Robinson ........... G06Q 20/3674
   705/52

(Continued)

FOREIGN PATENT DOCUMENTS

WO   WO-2005045571 A2 *  5/2005   ............. G06Q 20/04
WO   WO-2013102210 A1 *  7/2013   ........... G06Q 20/123

OTHER PUBLICATIONS

Galbally et al: "Image Quality Assessment for Fake Biometric Detection: Application to Iris, Fingerprint, and Face Recognition". IEEE Transactions on Image Processing, vol. 23, Issue 2, Feb. 2014 (Year: 2014).*

*Primary Examiner* — Edward J Baird
(74) *Attorney, Agent, or Firm* — Fish & Richardson P.C.

(57) ABSTRACT

Systems, apparatuses, and methods are provided for performing secure commercial transactions. The commercial transactions may be, for example, pre-pay pickup transactions, direct pay transactions, and transfer transactions. An identity of a user that initiates a commercial transaction may be verified based on biometric data. The biometric data may, for example, be representative of an image of at least a portion of a face of an individual, an image of an iris of an individual, at least a portion of a fingerprint of an individual, a temperature signature of an individual, a heartbeat signature of an individual, an odor characteristic of an individual, or a voice characteristic of an individual. The application can be utilized in commercial environments, getting rid of the traditional way to do transactions providing direct interaction between the merchant and the issuer of funds as well as allow an individual to engage as a buyer or seller position within a single profile, representative of an individual or business profile within a marketplace social community.

14 Claims, 13 Drawing Sheets

Related U.S. Application Data continuation of application No. 14/706,655, filed on May 7, 2015, now abandoned.

(60) Provisional application No. 62/003,474, filed on May 27, 2014.

(51) Int. Cl.
  *G06Q 20/12* (2012.01)
  *G06Q 20/32* (2012.01)
  *G06Q 20/40* (2012.01)
  *G06Q 30/06* (2023.01)
  *G06Q 50/00* (2012.01)

(52) U.S. Cl.
  CPC ......... *G06Q 20/3224* (2013.01); *G06Q 30/06* (2013.01); *G06Q 50/01* (2013.01)

(56) References Cited

U.S. PATENT DOCUMENTS

| | | |
|---|---|---|
| 7,942,313 B1 * | 5/2011 | Grimm ................ G06Q 20/042 705/40 |
| 8,280,120 B2 | 10/2012 | Hoyos et al. |
| 8,818,051 B2 | 8/2014 | Hoyos et al. |
| 8,818,052 B2 | 8/2014 | Hoyos et al. |
| 9,202,105 B1 | 12/2015 | Wang et al. |
| 10,453,004 B2 | 10/2019 | Davidson et al. |
| 2002/0025062 A1 | 2/2002 | Black |
| 2005/0060165 A1 * | 3/2005 | Knight .................. G06Q 10/08 705/333 |
| 2008/0086759 A1 * | 4/2008 | Colson ................... G06F 21/40 713/182 |
| 2009/0287837 A1 * | 11/2009 | Felsher ............... G06F 21/6245 709/229 |
| 2010/0198722 A1 * | 8/2010 | Lawrence .............. G06Q 30/02 707/E17.014 |
| 2010/0317420 A1 * | 12/2010 | Hoffberg ............ G06Q 30/0282 463/1 |
| 2013/0030875 A1 * | 1/2013 | Lee .................... G06Q 30/0601 705/14.58 |
| 2013/0036058 A1 | 2/2013 | Kelly et al. |
| 2013/0182913 A1 | 7/2013 | Hoyos et al. |
| 2013/0212655 A1 | 8/2013 | Hoyos et al. |
| 2013/0262873 A1 | 10/2013 | Read et al. |
| 2014/0032363 A1 * | 1/2014 | Zhao ..................... G06Q 30/06 705/26.25 |
| 2014/0164254 A1 | 6/2014 | Dimmick |
| 2014/0172727 A1 * | 6/2014 | Abhyanker ........ G06Q 30/0645 705/307 |
| 2014/0289833 A1 | 9/2014 | Briceno et al. |
| 2015/0206136 A1 | 7/2015 | Maddocks et al. |
| 2015/0227937 A1 | 8/2015 | Giles |
| 2015/0332271 A1 | 11/2015 | Collins et al. |
| 2015/0332362 A1 * | 11/2015 | Kalt ..................... G06Q 30/06 705/26.4 |
| 2016/0005038 A1 | 1/2016 | Kamal et al. |
| 2016/0050213 A1 | 2/2016 | Storr |
| 2016/0071111 A1 | 3/2016 | Wang et al. |

* cited by examiner

SYSTEMS AND METHODS FOR PERFORMING SECURE COMMERCIAL TRANSACTIONS

CROSS REFERENCE TO RELATED APPLICATIONS

This application is a continuation of U.S. patent application Ser. No. 16/232,589, filed Dec. 26, 2018, which is a continuation of U.S. patent application Ser. No. 14/706,655, filed May 7, 2015, which claims the benefit of priority, under 35 U.S.C. § 119(b), of U.S. Provisional patent No. 62/003,474, filed May 27, 2014, entitled "Multiple Payment Social Mobile Wallet", the disclosure of the prior applications are incorporated in their entirety herein by reference.

BACKGROUND

Commercial transactions, such as buying products at retail establishments, buying products via internet sites, and transferring funds from one account to another account, are often performed via a credit card, a debit card, or an electronic means. Cash transactions are becoming less frequent.

Use of stolen credit cards and other forms of fraudulent transactions are becoming common place. At most, an identity of an individual initiating a commercial transaction is verified by use of an identification, such as a driver's license, comparison of an individual's signature on a credit card, or the like.

Even more problematic is that merchants rarely, if ever, know individuals initiating commercial transactions. Thus, systems, apparatuses, and methods for performing secure commercial transactions are needed.

SUMMARY OF THE INVENTION

An apparatus for performing a secure commercial transaction, the apparatus comprising: a user interface module that enables a user to initiate a commercial transaction; a biometric data receiving module that is configured to receive biometric data representative of an identity of the user that initiates the commercial transaction; and a user identity verification module that verifies an identity of the user based on a comparison of the biometric data representative of the identity of the user that initiates the commercial transaction with sample data that is correlated with a particular individual.

In another embodiment, a payment method for use in a commercial transaction includes receiving a user initiation of a commercial transaction; receiving biometric data representative of an identity of the user that initiates the commercial transaction; and verifying an identity of the user based on a comparison of the biometric data representative of the identity of the user that initiates the commercial transaction with sample data that is correlated with a particular individual.

In a further embodiment, a non-transitory computer-readable medium storing instructions that, when executed by a processor, cause the processor to perform a secure commercial transaction, includes a user interface module that, when executed by a processor, causes the processor initiate a commercial transaction in response to a user input; a biometric data receiving module that, when executed by a processor, causes the processor to receive biometric data representative of an identity of the user that initiates the commercial transaction; and a user identity verification module that, when executed by a processor, causes the processor to verify an identity of the user based on a comparison of the biometric data representative of the identity of the user that initiates the commercial transaction with sample data that is correlated with a particular individual.

These and other features, aspects and advantages of the present invention will become better understood with reference to the following drawings, description and claims.

BRIEF DESCRIPTION OF THE DRAWINGS

FIG. 3 depicts an example method and apparatuses for user sign-up and user sign-in;

DETAILED DESCRIPTION OF THE INVENTION

Figure 1A:
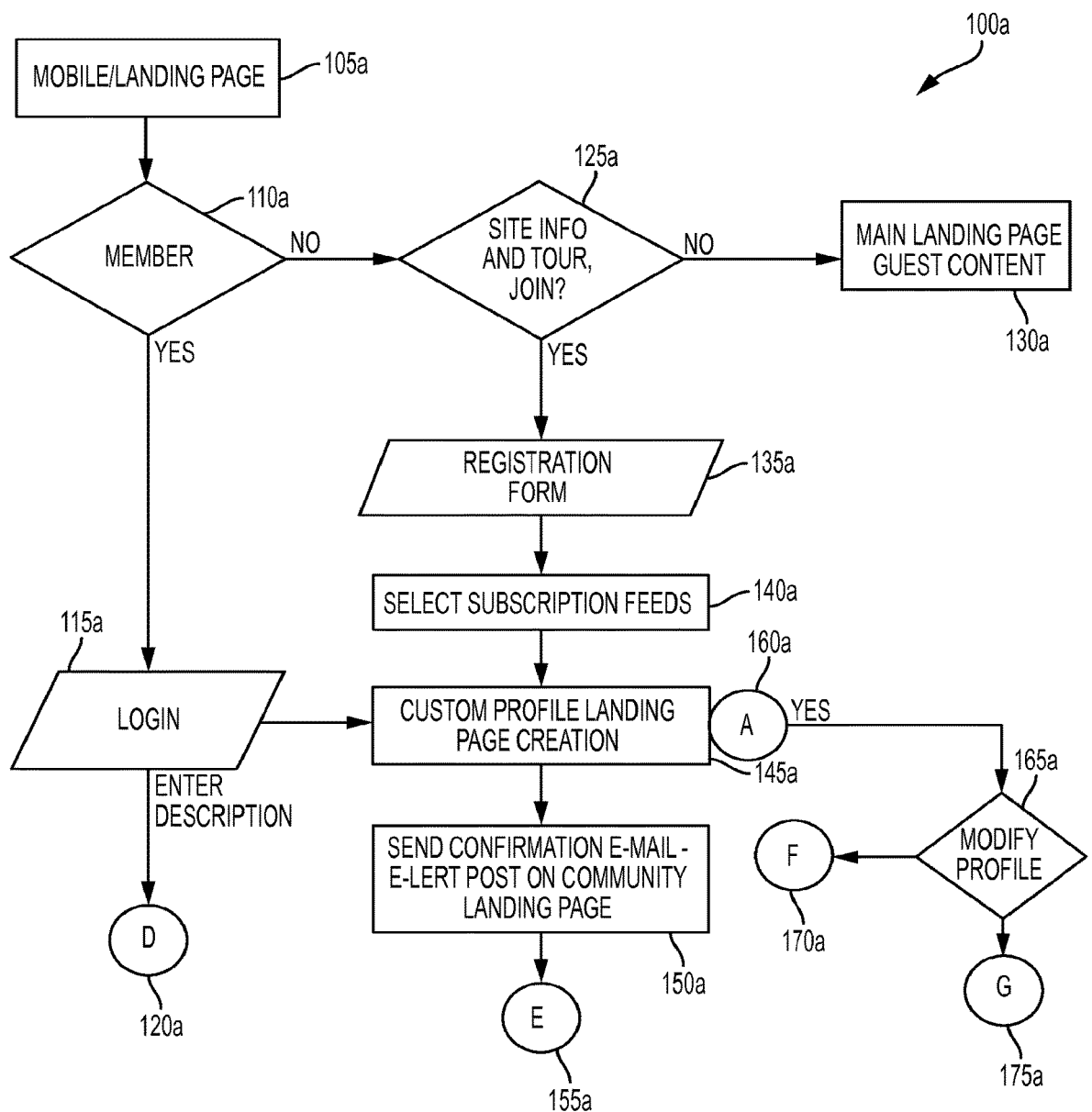
FIGS. 1A and 1B are connecting flow charts showing a method of social networking through mobile interactivity on a global basis, according to an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that may each be used independently of one another or in combination with other features.

Systems, apparatuses, and methods are provided for performing secure commercial transactions. The commercial transactions may be, for example, pickup transactions, direct pay transactions, and transfer transactions. The term "commercial transaction" is used herein to describe an interaction between two or more parties in which goods, services or something of value is exchanged. For example, something of value may be exchanged for some type of remuneration.

An identity of a user that initiates a commercial transaction may be verified based on biometric data. The biometric data may, for example, be representative of an image of at least a portion of a face of an individual, an image of an iris of an individual, at least a portion of a fingerprint of an individual, a temperature signature of an individual, a heartbeat signature of an individual, an odor characteristic of an individual, or a voice characteristic of an individual.

The present systems and methods may provide a real-time mobile payment application that provides users an ability to make a pre-paid pickup, a direct payment, or a transfer. As a particular example, a user may establish an account by entering, for example, a first name, a last name, an email address, a password, credit card information, debit card information, and sample biometric data (e.g., a series of digital images of at least a portion of their face). Subsequently, when the individual initiates a commercial transaction (e.g., a pre-paid pickup transaction, a direct pay transaction, or a transfer transaction), the individual takes a digital image of themself, or a merchant may take a digital image of the individual, and the digital image of the individual that initiated the commercial transaction is compared to the sample images provided at the time the account was established. Thereby, the identity of the individual initiating the commercial transaction may be verified.

Another embodiment of the present invention provides social networking systems using mobile communication devices or personal computers to manage business and social transactions from a single point of reference site. The social networking systems of the present disclosure may eliminate a need to access and log into multiple sites to carry out these tasks.

Embodiments of the present disclosure may include an application for using mobile technology to access an internet site; another application for use of personal computer technology, and another application to carry out multiple transactions from a single individual profile page at a reference site.

A method of the disclosure may operate through a website that accommodates what may be termed a "Lean Social Exchange."

Figure 1B:
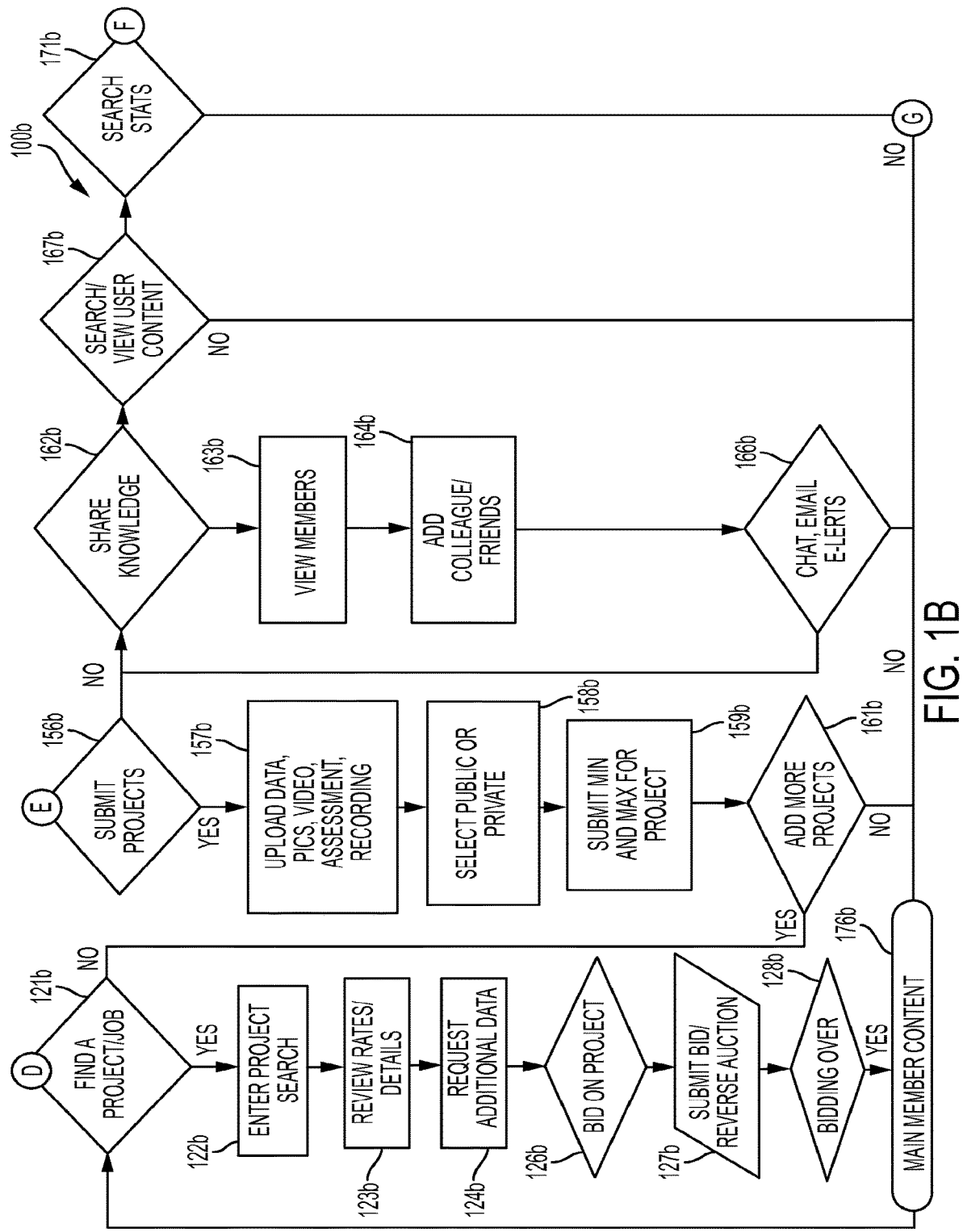

The application for use of a mobile device, which may be a cell phone or personal data assistant (PDA), or a personal computer is shown in the flowchart 100a, 100b of FIGS. 1A and 1B. Using either means of access, the user arrives at, for example, the derbywire.com URL and a mobile landing page 105a, and a decision point 110a to determine membership. If the user is not a member, the user may view site information 125a, take a site tour 125a, read through landing site page content 130a, and, if desired, join the site by filling out a registration form 135a and by providing sample biometric data (e.g., a series of images of a portion of their face, a finger print, a voice sample, a temperature characteristic, an odor sample, a heart rate signature, etc.). An email confirmation may then be sent to the newly joined member and an e-lert may be posted on an associated individual community-landing page 150a.

If the user joins the site, the user may select subscription feed 140a to be directed to an associated profile 160a. The user may also customize a profile page 145a as well as an individual community-landing page 150a.

At the personal profile page, the following may be done: taking personality assessments, download virtual book publications, upload and take tests, download online games, recordings, pictures, videos, virtual files and data, sms, receive messages from PCs or mobile devices, obtain a filtered list of mobile news, geo location awareness, advertisements, virtual tools, obtain mentors and tutors, internal virtual content search capability and access the community landing page.

The community landing page may be a user's individual community page where all the colleagues and friends the user has accepted in a profile may have access. The community landing page may have geo location capability, news, and listings of recent jobs, advertisements, user generated content, news channeling and the like.

If the user is already a member of the site, the user may log in 115a and navigate directly to an individual community-landing page 130a and then to an individual profile homepage 145a. The profile may have capability of being selectively set to a business or a leisure mode as set up by the user.

Once a user is a member of the site, the user may select an activity in which, for example, he seeks to find a project or job 121b. The user may submit a project for consideration 156b, or may share knowledge and virtual goods 162b.

The user may search for potential jobs or projects by entering a project or search criteria 122b, review rates and project details 123b, request additional data 124b, and may bid on an offer 126b. The user may also review any project or job offering details, and have the opportunity to bid on a project 126b, or if suitable, participate in a reverse auction 127b.

The user may also submit her own projects or job offer by selecting "submit project or job" where the user may upload any relevant information supporting the project or job requirements using site technology 156b, including incorporating a data storage file, pictures, video clips, assessments, recordings and other relevant information 157b. The user may also select minimum and maximum values for the purposes of auction 159b and may indicate whether the project is private or public 158b. By going back to a main member site and repeating the "submit project or job" option, the user may list a second project or job.

If the user is visiting the site to share knowledge 162b, the user may view other member's information 163b, add colleagues or friends to his profile 164b, email, chat or send e-alerts 166b.

The contents of the personal profile may include, for example, testing (e.g., "TagWire") assessments, online virtual publication downloads, online game downloads, recordings, pictures, videos, virtual files and data, geo location awareness, news streaming, use of virtual tools, and access to individual community landing pages for the communities the individual user develops with colleagues and friends 167b, 171b.

With reference to FIGS. 2A, 2B, 2C and 2D, flow diagrams 200a, 200b, 200c, 200d are depicted that illustrate steps for profile interactivity on a global basis. When using the system for this purpose, (FIGS. 2A and 2B), a user may log in as indicated 115a and may have the opportunity to check and read their email 215a before going to a community homepage 220a, where the user may view postings, advertisements, and online virtual publications and games and the like 235a. The user may then navigate to an individual profile homepage 240a where the user may post messages 255a or view messages others have posted 250a, 260a. The user may navigate to view his personal assessment 251b and then return to his individual profile homepage 252b. Messages may be posted on the profile by selecting a message button 265a, typing a message in a mobile of the profile page message box and selecting "accept" 270a.

At this point the user may navigate to online accessories 271b to download virtual publications or games 274b, 281b. The user may input a request for a publication or game search in the research box 273b, 282b, and purchase and download an accessory 274b, 283b. The user may return to the profile homepage 252b. Alternatively, instead of going to online accessories 271b, the user may go to a homepage 279*b* to request a game, for example. The user may input a request in a search box 282*b*, may select a game and may make a purchase 283*b*. The user may download a game in an accessory storage file 284*b*, from where the user may access the game using a mobile device or PC 286*b*.

Figure 2A:
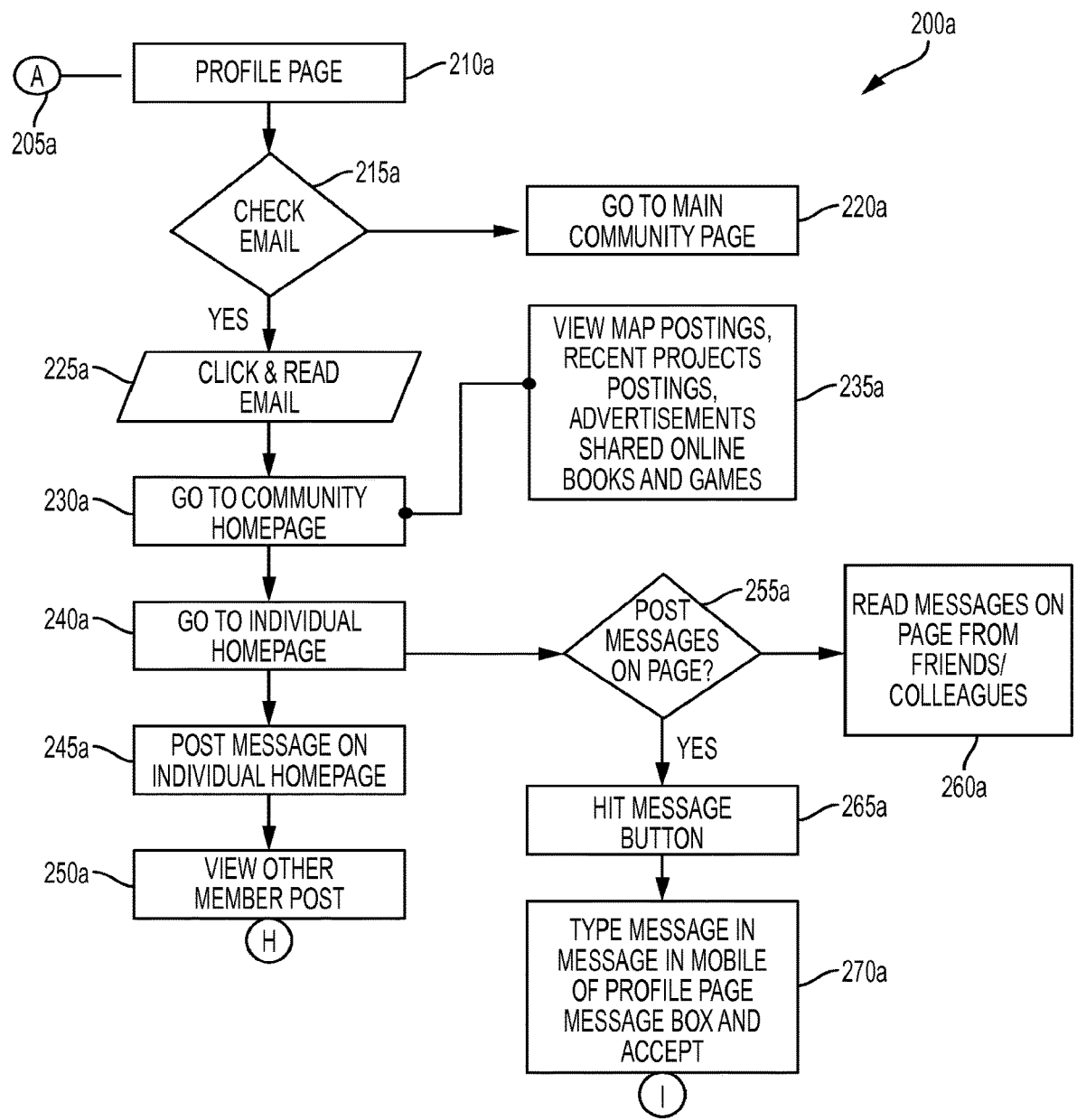
FIGS. 2A and 2B are connecting flow charts and, along with FIGS. 2C and 2D, are a series of flow charts showing a method of social networking through profile interactivity on a global basis, according to an embodiment of the present invention.
Figure 2B:
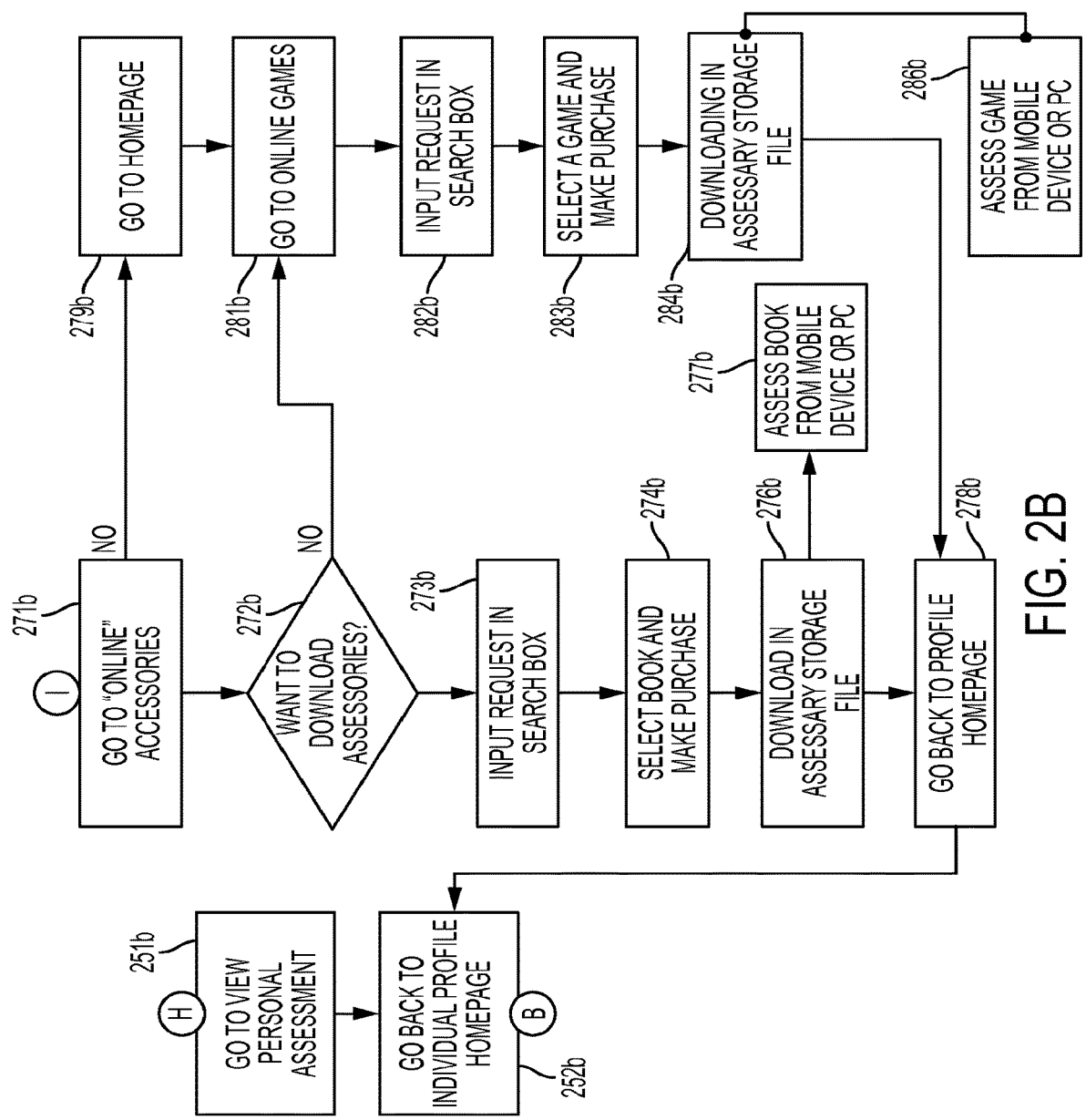
Figure 2C:
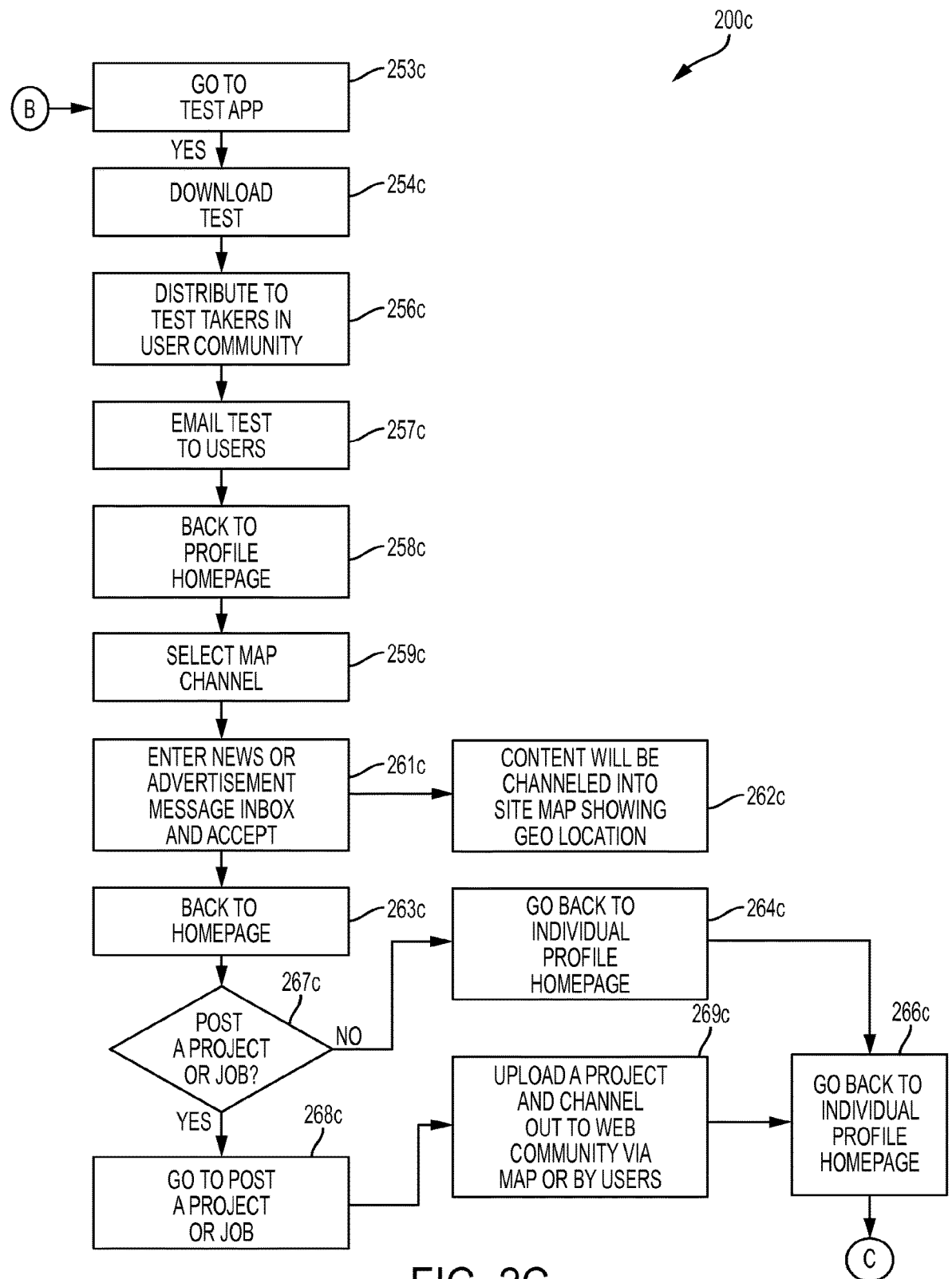

In an alternative interactive profile as shown in FIG. 2C, a user may navigate from an individual profile page (FIG. 1A, point A) 205*a* to a testing application site (FIG. 2C, point B) 253*c* from where the user may, for example, download a test through a mobile device or PC 254*c*. The user may distribute the test to test-takers in the user community 256*c*, perhaps by email 257*c*. At this point, a user may have an option to return to a profile homepage 258*c* and select, for example, a map channel 259*c*. Here the user may access news or advertisement message inbox and may accept 261*c*. The content may be channeled into a site map showing, for example, a geo location 262*c*. The user may now return to a homepage 263*c*, post a job or project 267*c*, or if not, navigate to an individual profile page 264*c* to arrive at point C in FIG. 2C 266*c*.

Figure 2D:
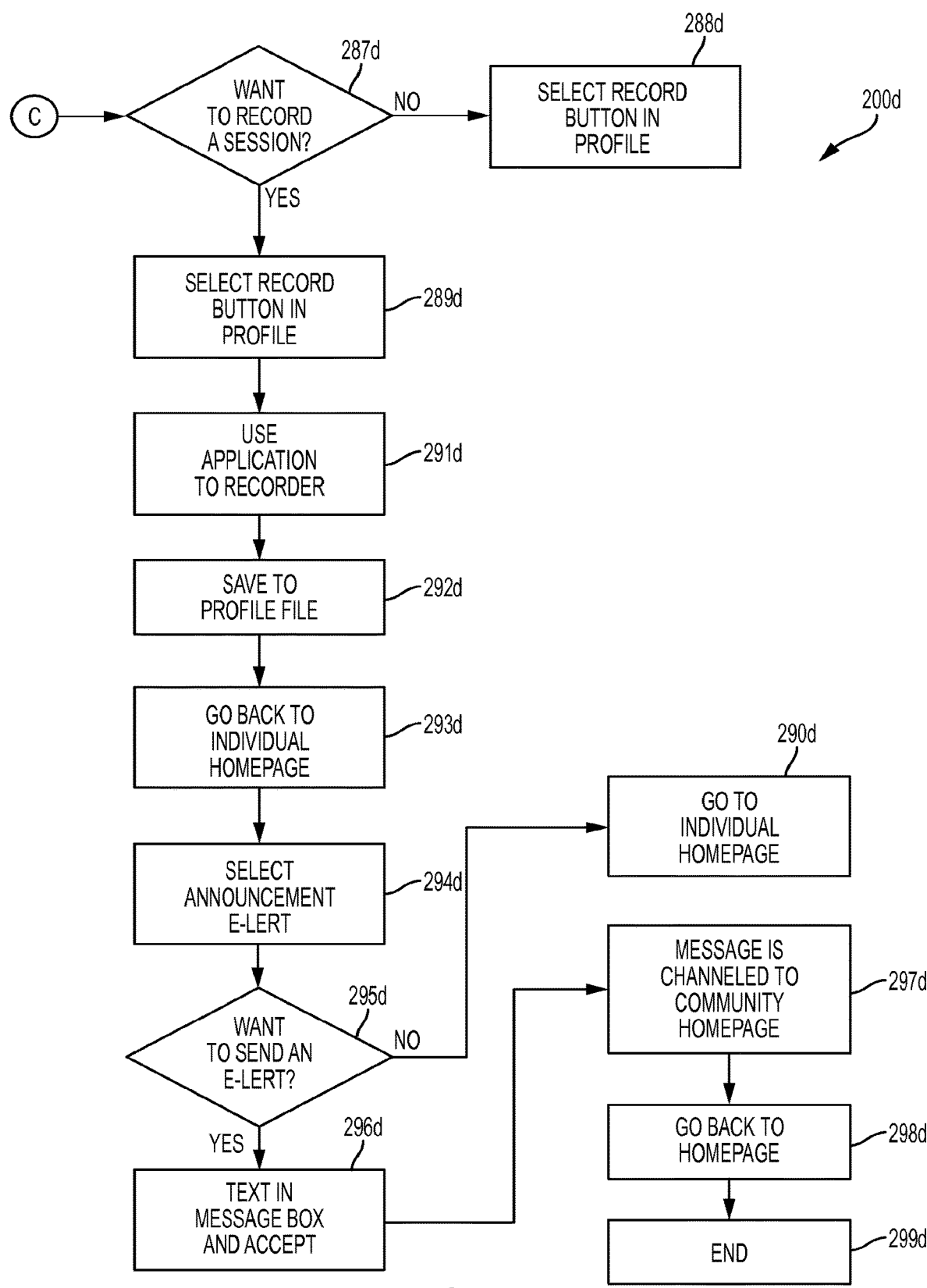

From point C, the user may navigate on, as shown in FIG. 2D, to, for example, a site to record a session 287*d* by selecting the record button in his profile (FIG. 2D, point C) 288*d*, 289*d*. The application may be used to record to the site profile from a PC or mobile device 291*d*. The user may save the recording to profile 292*d*. If the user chooses not to record a session, the user may return to the individual homepage immediately 293*d*. The user may select an announcement e-alert from the profile 294*d*, text in a message in the message box 296*d* and accept 295*d*. The message may be channeled to the community homepage 297*d*, and the user may return to the homepage 298*d*. Any of these tasks may be done from any mobile device or a personal computer.

Figure 3:
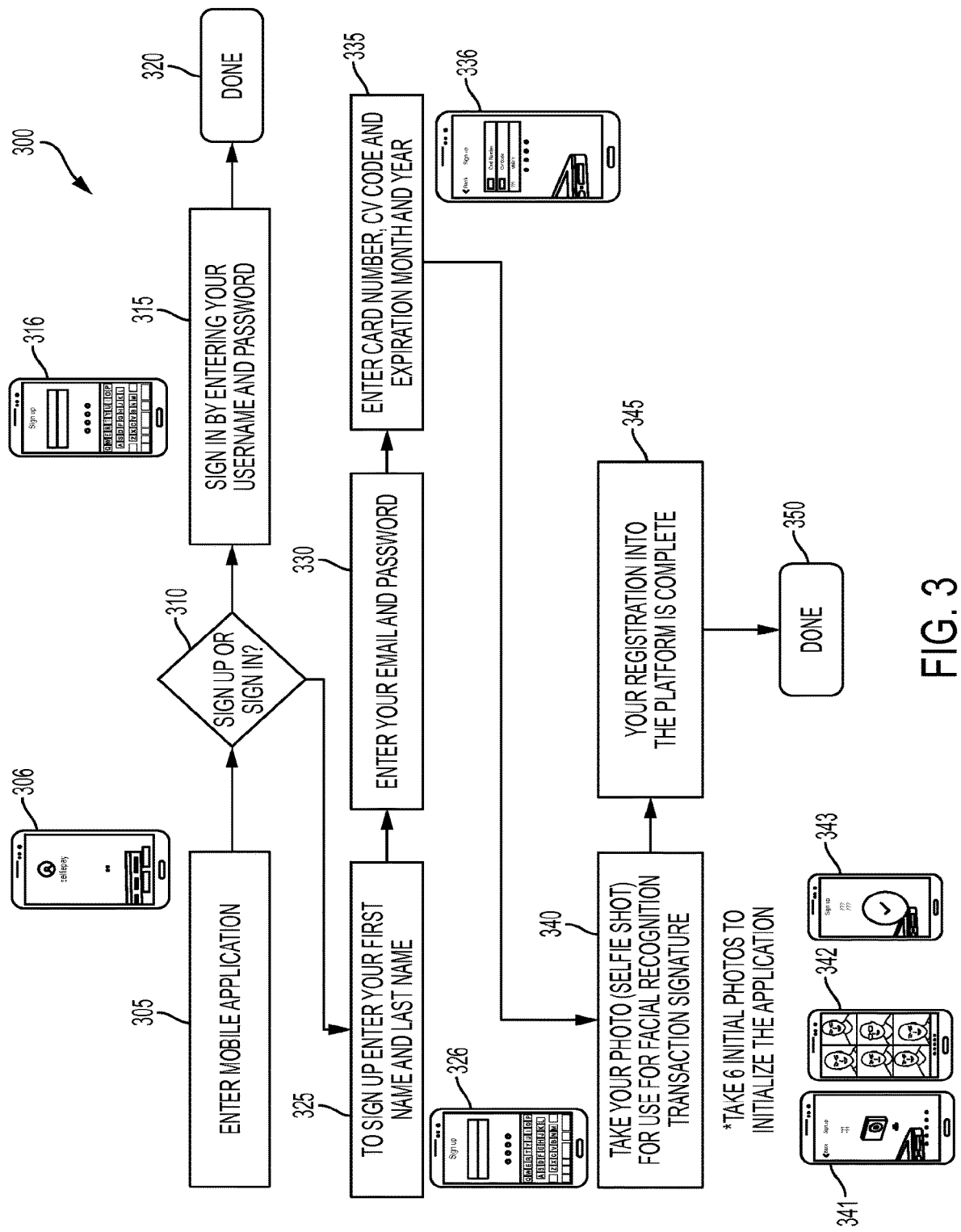

Turning to FIG. 3, an example method 300 and example apparatus 306, 316, 326, 336, 341, 342, 343 to sign-up 325 and sign-in 310 are illustrated. The apparatus 306, 316, 326, 336, 341, 342, 343 may be, for example, a common smart phone capable of generating the various user interfaces shown on the individual device 306, 316, 326, 336, 341, 342, 343. The user may sign-up 325 by, for example, entering their first and last name, email and password 330, credit (and/or debit) card number, cv code and expiration month and year 335, and storage of sample biometric data (e.g., a facial digital photograph, an iris digital photograph, a voice signature, a temperature signature, a heart rate signature, an odor characteristic, and/or a fingerprint) for future matching 335. Once the information is captured, registration may be complete 345, 350. Sign-in to a mobile application may entail using an email and a password, and the user may be automatically initially directed to their profile. The profile may provide the user an ability to manage their items being sold, settings, shopping cart, activity, card wallet, and dashboard. The profile may also allow the user to navigate to payment options.

Figure 4:
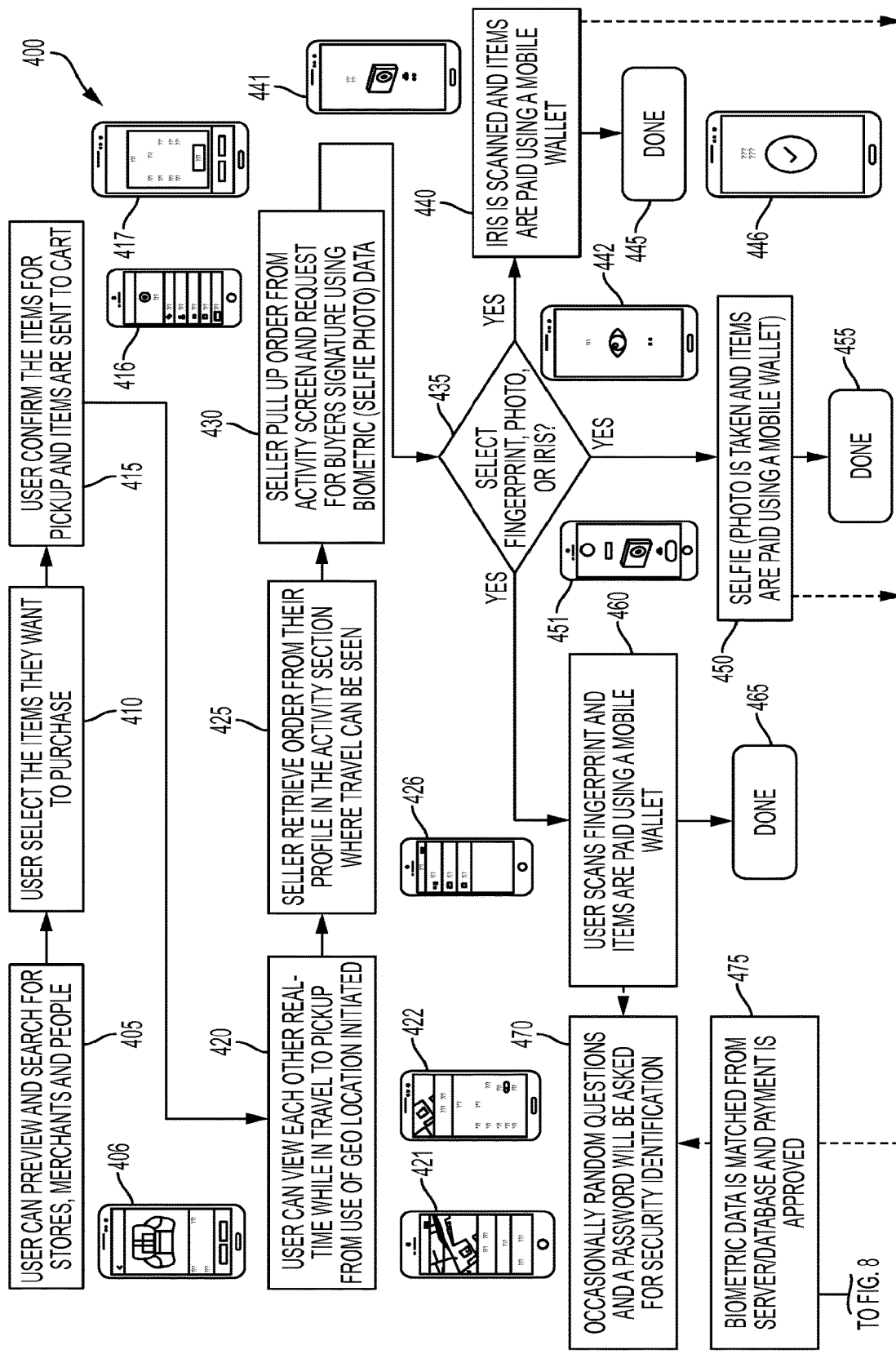
FIG. 4 depicts an example method and example apparatuses for performing a pre-paid pickup transaction.

With reference to FIG. 4, an example method 400 and example apparatus 406, 416, 417, 421, 422, 426, 441, 451, 442, 446 for performing a pre-paid pickup transaction are illustrated. The apparatus 406, 416, 417, 421, 422, 426, 441, 451, 442, 446 may be, for example, a common smart phone capable of generating the various user interfaces shown on the individual device 406, 416, 417, 421, 422, 426, 441, 451, 442, 446. The prepay pickup may allow the user to order items before they get to a location 405, 410, 415. While traveling to a pickup location, both the buyer and the seller may see each other in real-time while traveling with a lapse of time visible from the mobile application 420, 425. Once the user makes it to the location, the seller may pull up an order on their activity screen of the application 430, and may request a biometric signature from the buyer for a confirmation of pickup 435, 440, 460, 470. Occasionally random questions and a password may be asked for to further verify identification 470. Once the biometric signature (e.g., facial image, finger print, voice signature, etc.) is received, the transaction may be complete 445, 455, 465, and both parties may receive an email documenting completion of the transaction along with data representative of the biometric signature 475.

Figure 5:
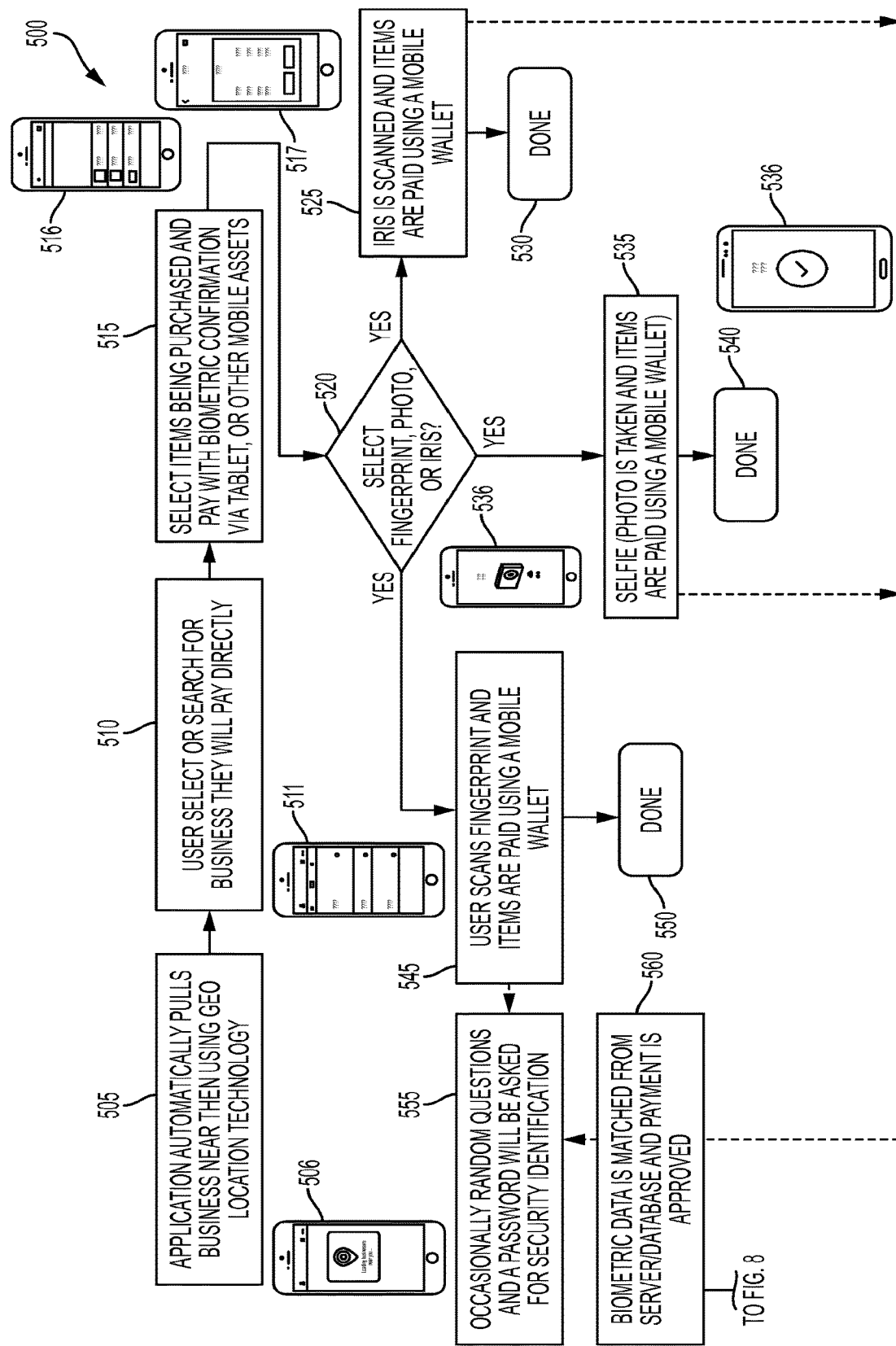
FIG. 5 depicts an example method and example apparatuses for performing a direct pay transaction.

Turning to FIG. 5, an example method 500 and example apparatuses 506, 511, 516, 517, 536 for performing a direct pay transaction are illustrated. The apparatus 506, 511, 516, 517, 536 may be, for example, a common smart phone capable of generating the various user interfaces shown on the individual device 506, 511, 516, 517, 536. If the user initiates a direct pay to a business, for example, the user may select to pay from a menu and, in a pay section of the application, businesses may be automatically retrieved using geo location 505. The user may also search to find a business with which the user wants to conduct a direct pay 510. Once the business is identified, purchase items may be selected and stored in the user's shopping cart for purchase, and a summary of all items may be depicted to confirm, for the seller, the purchase list. When the user is ready to pay, the seller may pull the order from the seller's activity section of the application from their profile 515 and collect the buyer's biometric signature (e.g., facial digital image, iris digital image, etc.) 520, 525, 535, 545 to finalize payment for items that where confirmed in cart. Occasionally random questions and a password may be asked for to further verify identification 555. The biometric signature may be provided to the seller, and the transaction may be complete 530, 540, 550. Each party may receive an email confirmation after completion of the transaction 560.

Figure 6:
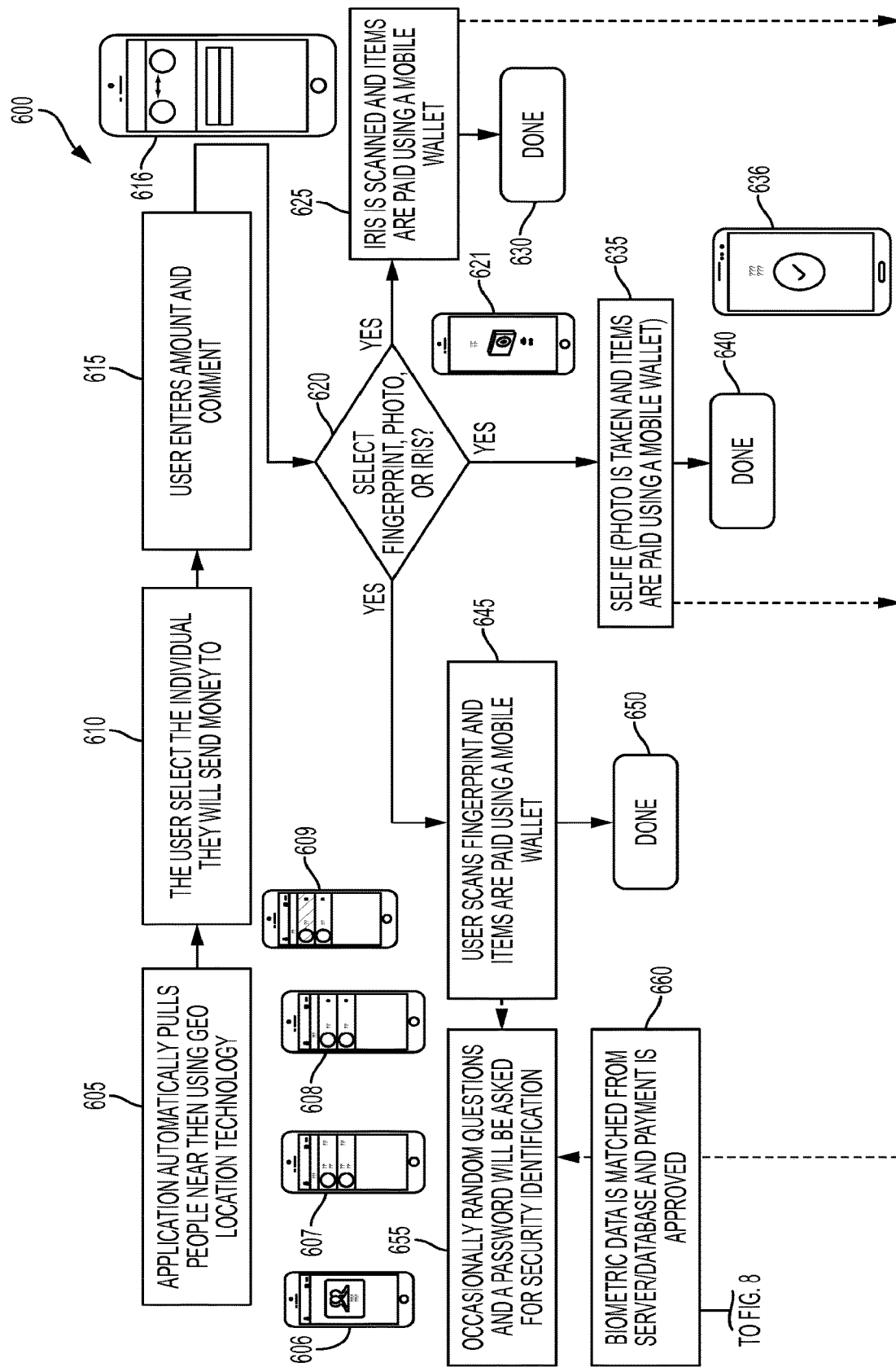
FIG. 6 depicts an example method and example apparatuses for performing a transfer transaction.

With reference to FIG. 6, an example method 600 and example apparatuses 606, 607, 608, 609, 616, 621, 636 for performing a transfer transaction are illustrated. The apparatus 606, 607, 608, 609, 616, 621, 636 may be, for example, a common smart phone capable of generating the various user interfaces shown on the individual device 606, 607, 608, 609, 616, 621, 636. If the user executes a transfer, the user may receive an automatic pull of people nearby through use of, for example, a geo location 605. The user may also be given an option of conducting a search to find another user they want to transfer funds 610. Once the person is found, that the user wants to transfer money to, the sender may enter an amount to be transferred, as well as, a comment to the person receiving the transfer 615. A biometric signature may be provided by the person sending the funds 620, 625, 635, 645 and the receiver may, as well, provide their biometric signature 620, 625, 635, 645 to receive the funds. Once the person on the receiving end of the transfer enters their biometric signature, the transfer transaction may be complete 630, 640, 650. Occasionally random questions and a password may be asked for to further verify identification 655. Once completed, each party may receive an email to confirm completion 660.

Figure 7:
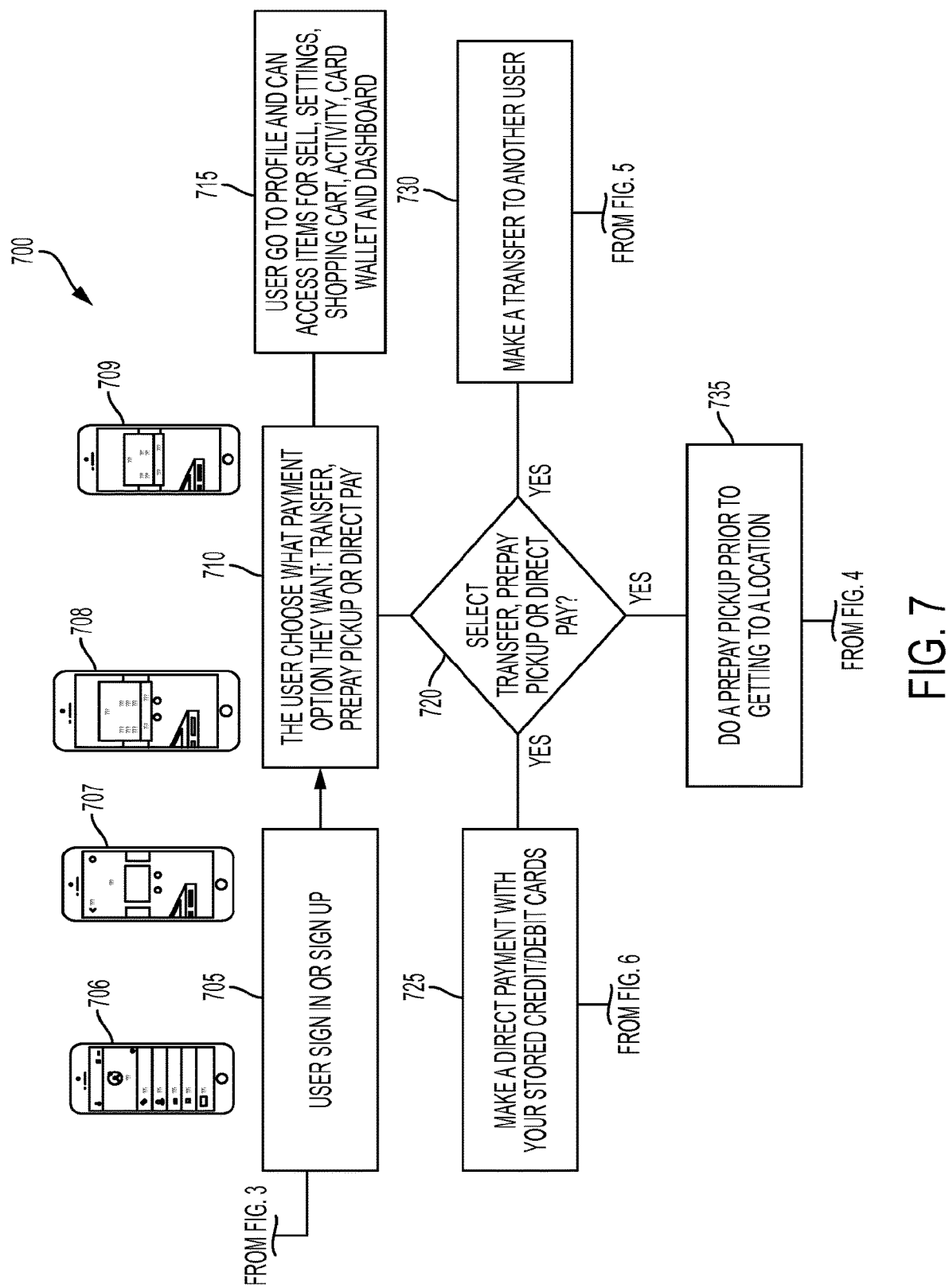
FIG. 7 depicts an example method and example apparatuses for a mobile wallet for performing a pre-paid pickup transaction, a direct pay transaction, and a transfer transaction.

Turning to FIG. 7, an example method 700 and example apparatuses 706, 707, 708, 709 for performing mobile wallet functions 705, 710, 715 are illustrated. The apparatus 706, 707, 708, 709 may be, for example, a common smart phone capable of generating the various user interfaces shown on the individual device 706, 707, 708, 709. In summary, there may be three types of commercial transactions with this multiple payment social mobile wallet process 720: 1) a pre-paid pickup transaction 735, 2) a direct pay transaction 725, and 3) a transfer transaction 730. This process 700 may be supported by a wallet where users are allowed to store their different forms of payments of credit or debit cards 710, providing flexibility of the user to use different forms of payments as they would if the user had all their cards in their physical wallet. A biometric confirmation may be employed to allow the cards to be transacted against. Moreover, for security, the user may occasionally be asked a random question to ensure that the user of the application is the owner of the profile being used within the payment application. Lastly, all payment transactions may also be logged on the web correlated with the associated biometric data, providing the user with the ability to access viewing of their transactions on the web.

Figure 8:
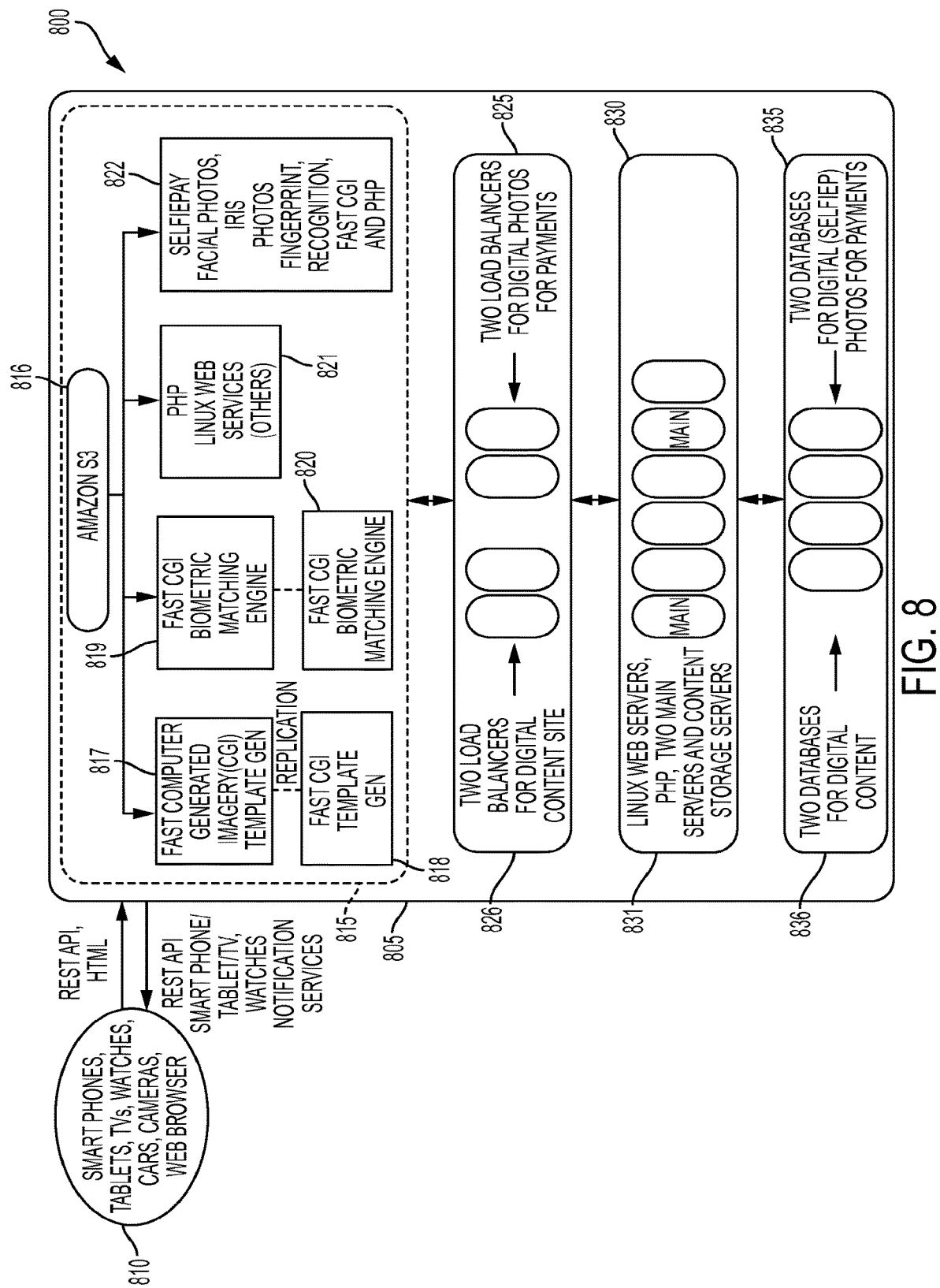
FIG. 8 depicts an example system for biometric matching facilitation through a server architecture.

With reference to FIG. 8, an example system 800 for biometric matching facilitation through a server architecture is illustrated. Biometric signatures may be matched to confirm transactions. The servers 830, 831, databases 835, 836, and load balancers 825, 826 may operate in unison to facilitate the matching of images or biometric data stored to ensure an accuracy in the matching process for payment confirmation. The mobile notification services may provide information flow to, for example, mobile telephones, tablets, smart-watches, cameras and web browsers 810, back and forth for matching confirmation. The biometric matching may provide a controlled social payment experience that allows users to ensure all commercial transactions are secure and controlled as the transactions are executed. As depicted in FIG. 8, the server architecture 805 may include a commercial transaction site 815, such as Amazon S3 having a fast computer generated imagery (DGI) template generator 817, a fast computer generated imagery template generator replication 818, a fast CGI biometric matching engine 819, a fast CGI biometric matching engine replication 820, PHP Linux Web Services 821, and a facial photos, iris photos, fingerprint, voice, heart rate, body temperature, etc. recognition fast CGI and PHP 822.

Verification of an identity of an individual, that initiates a commercial transaction, may include acquiring a digital image of at least a portion of the individual's face (e.g., via a camera of a smartphone, a tablet computer, a digital camera, etc.) in conjunction with the given commercial transaction. The digital image of at least a portion of the individual's face, taken in conjunction with the given commercial transaction, may be automatically compared with at least one previously acquired digital image (e.g., a digital image acquired in conjunction with an initial user account registration and/or a digital image acquired in conjunction with a previously executed commercial transaction), and an verification may be indicated when a probability of a match between the digital image taken in conjunction with the current commercial transaction and the previously acquired digital image exceeds a threshold. Alternatively, or additionally, the digital image of at least a portion of the individual's face, taken in conjunction with the current commercial transaction, may be automatically compared with a plurality of previously acquired digital images, and an verification may be indicated when a probability of a match between a digital image taken in conjunction with the current commercial transaction and any given previously acquired digital image exceeds a threshold. As yet another alternative, or addition, verification of an identity may be based on a composite probability of a match between a digital image taken in conjunction with the current commercial transaction and a plurality of previously acquired digital image exceeds a threshold (e.g., a probability of a match between a digital image taken in conjunction with the current commercial transaction and a first previously acquired digital image may be 90%, a probability of a match between the digital image taken in conjunction with the current commercial transaction and a first previously acquired digital image may be 80%, and the composite probability of a match is, therefore, 85%). A composite probability may be based on a comparison of a currently acquired digital image with any number of previously acquired digital images and/or may be based on a comparison of a plurality of currently acquired digital images with any number of previously acquired digital images.

The systems and methods of the present disclosure may account for changes in an individual's appearance by storing digital images acquired in conjunction with any given commercial transaction for comparison with digital images acquired in conjunction with future commercial transactions. For example, the systems and methods may account for a person growing a beard, a person aging, a person wearing glasses, etc.

Figure 9:
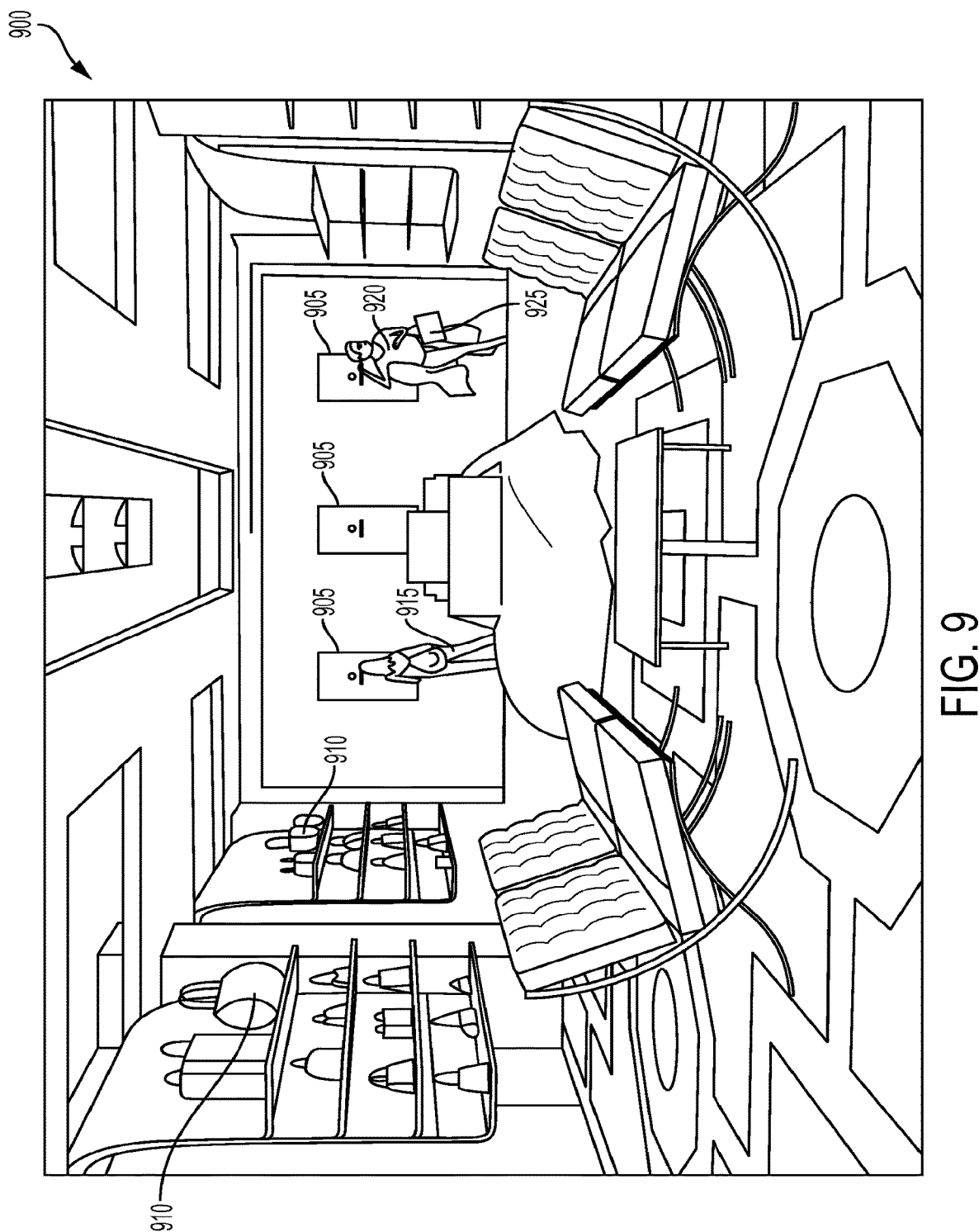
FIG. 9 depicts an example retail settings with interactive monitors, tablets, phones, watches for performing secure commercial transactions.

Turning to FIG. 9, an example retail setting 900 illustrated. An application may be used in a retail setting 900 with interactive monitors 905, tablets, phones 920, and/or watches, replacing traditional checkout stations. Users 915 may be a member of a mobile payment application, as described herein, prior to using the retail setting 900. Interactive monitors 905 may be used within the retail stores to allow for visual browsing of merchandise 910, 925, and to complete a payment transaction. In addition, facial recognition software may be used to identify returning customers in a retail store during store entry. This may be provided to retailers around the globe. Any given retail setting 900 may include an interactive monitor 905 that incorporates an interactive overlay displayed on a television. For example, an interactive monitor (e.g., an ED-D Series Commercial LED LDC Display, as available from Samsung) may incorporate a display generator (e.g., a chrome box, as available from Asus Computer International, 800 Corporate Way, Fremont, Calif. 94539) to display a user interface of a commercial transaction application on an associated screen.

Any, or all, of the apparatuses 306, 316, 326, 336, 341, 342, 343, 406, 416, 417, 421, 422, 426, 441, 451, 442, 446, 506, 511, 516, 517, 536, 606, 607, 608, 609, 616, 621, 636, 706, 707, 708, 709 and/or a server 830, 831 may include a processor configured to, for example, execute a user interface module, a biometric data receiving module, a user identity verification module, a wireless communication module, a sample data receiving module, an image capture module, a pre-pay pickup transaction module, a direct pay transaction module, a transfer transaction module. Any one of the user interface module, the biometric data receiving module, a user identity verification module, a wireless communication module, the sample data receiving module, the image capture module, the pre-pay pickup transaction module, the direct pay transaction module, the transfer transaction module may be embodiment in hardware (e.g., an application specific integrated circuit (ASIC), a plurality of discrete electrical components, etc.), may be embodied as software and stored as computer-readable instructions on a non-transitory computer-readable medium, or may be a combination of hardware and software.

In particular, execution of a user interface module may enable a user to initiate a commercial transaction that involves an exchange of something for value. Execution of a biometric data receiving module may, for example, cause an associated apparatus to receive biometric data representative of an identity of the user that initiates the commercial transaction. Execution of a user identity verification module may, for example, cause an associated apparatus to verify an identity of the user based on a comparison of the biometric data representative of the identity of the user that initiates the commercial transaction with sample data that is correlated with a particular individual. Execution of a wireless communication module may, for example, cause an associated apparatus to transmit biometric data, correlated with a commercial transaction, from a handheld device to a remote computing device. Execution of a sample data receiving module may, for example, cause an associated apparatus to receive sample data that is representative of a plurality of images of a particular individual. Execution of an image capture module may, for example, cause an associated apparatus to receive biometric data that is representative of an image of the user that initiates the commercial transaction, and the sample data may be representative of at least one image that is correlated with a particular individual. Execution of a pre-pay pickup transaction module may, for example, cause an associated apparatus to perform a pre-pay pickup transaction. Execution of a direct pay transaction module may, for example, cause an associated apparatus to perform a direct pay transaction. Execution of a transfer transaction module may, for example, cause an associated apparatus to perform a transfer transaction.

By using one point of reference login capability to one site rather than multiple sites, the system may gather together privatized video use and global information sharing for business real-time, profile use and testing and upload, file exchange, personality assessment and personal development, statistical job performance rating, job interviewing via video together with storing on the profile, submitting a project and bidding for a job. The user may add multiple jobs or projects to the site and allow access to jobs globally from a mobile device. Members may participate in reverse auctions real-time from their mobile device and accept jobs and submit jobs back to the outsourcer and get paid in ecommerce.

Methods may direct a profile to a business or a leisure mode for viewing of associated members. The method may channel news from the associated profile to a mobile device and a geo location capability from the profile to a mobile device, and upload files to the profile while providing access from the mobile device. The method may connect applications to the profile, either to store or use. Chats, emails, videos, files and real-time e-lerts will be able to be channeled back and forth from mobile devices to PCs.

The method may also provide member interactivity. Members may be able to collaborate with other users in either business or leisure mode while what is being viewed on the profile page is protected from what is being viewed on profiles by other users in the social networking community. Members will be able to view other members in their community as well as search for other members for job tasks or mentorship. E-alerts and some messages may be filtered to the site map with a GPS identifier.

It is contemplated that a user may select advertisements on profiles, and advertiser banners may be rated for the most hits. Members of the site may have an ability to create advertisements from a PC or mobile device and may be filtered into a site map or individual community-landing page of an individual.

An associated commercial transaction site may allow users to use one password login instead of several. A registration form may be submitted to ensure that other users are protected and the necessary information is collected to ensure protection of integrity of job biddings, ratings of user performance and uploads of job or project listings. A computer may help execute the functions provided on a social network. A mobile device may provide full access and participation in the process designed for Internet users.

A one-point information sharing system and method of the present disclosure may solve the problem of internet users having to access multiple sites to accomplish simple tasks such as professional/friend connections, collaborations, use of virtual tools and goods, job searches and leisure networking. The site may improve efficiency of job searches. The site may open new doors for collaboration and personal development and still offer leisure activities.

It should be understood that the foregoing relates to exemplary embodiments, and that modifications may be made without departing from the spirit and scope of the invention as set forth in the appending claims.

What is claimed is:

1. A computer-implemented method comprising:
storing, in a biometric data database, particular, sample biometric data of a particular user as part of an account enrollment process;
determining, by one or more transaction facilitation servers, that the particular user has initiated a transaction with a different user while the particular user is located away from a pickup location specified as a completion location of the transaction;
providing, by the one or more transaction facilitation servers and while the particular user is traveling to the pickup location, one or more real-time images of the different user captured by a first mobile computing device of the different user to the particular user after determining that the transaction has been initiated;
providing, by the one or more transaction facilitation servers and while the different user is traveling to the pickup location, at least one real-time image of the particular user captured by a second mobile computing device of the particular user after determining that the particular user has initiated the transaction;
storing, by the one or more transaction facilitation servers and in a transaction log, data identifying the transaction in correlation with current biometric data captured by the second mobile device at the pickup location;
providing a presentation of time lapse information and corresponding geolocation information of the particular user in a user interface of the different user as the particular user travels to the pickup location;
determining, by the one or more transaction facilitation servers after the particular user has arrived at the pickup location, that the current biometric data of the particular user captured by the second mobile computing device at the pickup location matches the particular sample biometric data that was provided by the particular user as part of the enrollment process;
designating, by the one or more transaction facilitation servers after the current biometric data of the particular user is determined to match the particular, sample biometric data, the transaction as complete; and
providing, by the one or more transaction facilitation servers, a confirmation message that indicates that the transaction has been designated as complete.

2. The method of claim 1, further comprising:
providing, by the one or more transaction facilitation servers while the particular user travels to the pickup location, one or more verification questions as output on a user interface of the second mobile computing device;

verifying an identity of the particular user based on one or more responses to the one or more verification questions; and providing, at the first mobile computing device, a geolocation of the particular user during travel to the pickup location.

3. The method of claim 2 further comprising, before the particular user has initiated the transaction, using a geolocation module of the second mobile computing device of the particular user to identify the different user as a party to the transaction.

4. The method of claim 3, wherein the one or more real-time images comprise live video.

5. The method of claim 4, wherein the one or more transaction facilitation servers further facilitate one or more payments as part of the transaction.

6. A transaction facilitation system comprising:
one or more processing devices of one or more transaction facilitation servers; and
one or more storage devices storing instructions that are executable by the one or more processing devices, wherein execution of the instructions cause the one or more processing devices to perform operations comprising:
storing, in a biometric data database, particular, sample biometric data of a particular user as part of an account enrollment process;
determining that the particular user has initiated a transaction with a different user while the particular user is located away from a pickup location specified as a completion location of the transaction;
providing, while the particular user is traveling to the pickup location, one or more real-time images of the different user captured by a first mobile computing device of the different user to the particular user after determining that the transaction has been initiated;
providing, while the different user is traveling to the pickup location, at least one real-time image of the particular user captured by a second mobile computing device of the particular user after determining that the particular user has initiated the transaction;
storing, by the one or more transaction facilitation servers and in a transaction log, data identifying the transaction in correlation with current biometric data captured by the second mobile device at the pickup location;
providing a presentation of time lapse information and corresponding geolocation information of the particular user in a user interface of the different user as the particular user travels to the location;
determining, after the particular user has arrived at the pickup location, that the current biometric data of the particular user captured by the second mobile computing device at the pickup location matches the particular, sample biometric data that was provided by the particular user as part of the enrollment process;
designating, by the one or more transaction facilitation servers after the current biometric data of the particular user is determined to match the particular, sample biometric data, the transaction as complete; and
providing, by the one or more transaction facilitation servers, a confirmation message that indicates that the transaction has been designated as complete.

7. The system of claim 6, wherein the instructions cause the one or more processing devices to perform operations further comprising:
providing, by the one or more transaction facilitation servers while the particular user travels to the pickup location, one or more verification questions as output on a user interface of the second mobile computing device;
verifying an identity of the particular user based on one or more responses to the one or more verification questions; and
providing, at the first mobile computing device, a geolocation of the particular user during travel to the pickup location.

8. The system of claim 7 wherein the instructions cause the one or more processing devices to perform operations further comprising, before the particular user has initiated the transaction, using a geolocation module of the second mobile computing device of the particular user to identify the different user as a party to the transaction.

9. The system of claim 8, wherein the one or more real-time images comprise live video.

10. The system of claim 9, wherein the one or more transaction facilitation servers further facilitate one or more payments as part of the transaction.

11. A non-transitory computer-readable storage device storing instructions, that when executed by one or more processors of one or more transaction facilitation servers, cause performance of operations comprising:
storing, in a biometric data database, particular, sample biometric data of a particular user as part of an account enrollment process;
determining that the particular user has initiated a transaction with a different user while the particular user is located away from a pickup location specified as a completion location of the transaction;
providing, while the particular user is traveling to the pickup location, one or more real-time images of the different user captured by a first mobile computing device of the different user to the particular user after determining that the transaction has been initiated;
providing, while the different user is traveling to the pickup location, at least one real-time image of the particular user captured by a second mobile computing device of the particular user after determining that the particular user has initiated the transaction;
storing, by the one or more transaction facilitation servers and in a transaction log, data identifying the transaction in correlation with current biometric data captured by the second mobile device at the pickup location;
providing a presentation of time lapse information and corresponding geolocation information of the particular user in a user interface of the different user as the particular user travels to the location;
determining, after the particular user has arrived at the pickup location, that the current biometric data of the particular user captured by the second mobile computing device at the pickup location matches the particular, sample biometric data that was provided by the particular user as part of the enrollment process;
designating, by the one or more transaction facilitation servers after the current biometric data of the particular user is determined to match the particular, sample biometric data, the transaction as complete; and
providing, by the one or more transaction facilitation servers, a confirmation message that indicates that the transaction has been designated as complete.

12. The non-transitory computer-readable storage device of claim 11, wherein the instructions cause the one or more processors to perform operations further comprising:
- providing, by the one or more transaction facilitation servers while the particular user travels to the pickup location, one or more verification questions as output on a user interface of the second mobile computing device;
- verifying an identity of the particular user based on one or more responses to the one or more verification questions; and
- providing, at the first mobile computing device, a geolocation of the particular user during travel to the pickup location.

13. The non-transitory computer-readable storage device of claim 12 wherein the instructions cause the one or more processors to perform operations further comprising, before the particular user has initiated the transaction, using a geolocation module of the second mobile computing device of the particular user to identify the different user as a party to the transaction.

14. The non-transitory computer-readable storage device of claim 13, wherein the one or more real-time images comprise live video.

* * * * *

UNITED STATES PATENT AND TRADEMARK OFFICE
CERTIFICATE OF CORRECTION

| | | |
|---|---|---|
| PATENT NO. | : 11,983,718 B2 | Page 1 of 1 |
| APPLICATION NO. | : 17/663130 | |
| DATED | : May 14, 2024 | |
| INVENTOR(S) | : Sharron Battle | |

It is certified that error appears in the above-identified patent and that said Letters Patent is hereby corrected as shown below:

In the Claims

In Claim 6, Column 11, Line 52, delete "location;" and insert -- pickup location; --

In Claim 11, Column 12, Line 54, delete "location;" and insert -- pickup location; --

Signed and Sealed this
Eighth Day of April, 2025

Coke Morgan Stewart
*Acting Director of the United States Patent and Trademark Office*